(12) United States Patent
Yoo (10) Patent No.: US 8,456,573 B2
(45) Date of Patent: Jun. 4, 2013

(54) APPARATUS AND METHOD FOR PROVIDING DIGITAL MULTIMEDIA BROADCAST SERVICE USING AN EXTERNAL DEVICE AND A DIGITAL TV

(75) Inventor: Cheol-Sun Yoo, Daegu (KR)

(73) Assignee: Samsung Electronics Co., Ltd., Samsung-ro, Yeongtung-gu, Suwon-si, Gyeonggi-do (KR)

(*) Notice: Subject to any disclaimer, the term of this patent is extended or adjusted under 35 U.S.C. 154(b) by 412 days.

(21) Appl. No.: 12/696,289

(22) Filed: Jan. 29, 2010

(65) Prior Publication Data

US 2010/0201877 A1   Aug. 12, 2010

(30) Foreign Application Priority Data

Feb. 10, 2009   (KR) ........................ 10-2009-0010459

(51) Int. Cl.
*H04N 3/27* (2006.01)
*H04N 5/45* (2006.01)
*H04N 7/173* (2006.01)

(52) U.S. Cl.
USPC ........................... 348/554; 348/565; 725/118

(58) Field of Classification Search
None
See application file for complete search history.

(56) References Cited

U.S. PATENT DOCUMENTS

| | | | |
|---|---|---|---|
| 6,052,740 A * | 4/2000 | Frederick | 710/8 |
| 2004/0027996 A1 * | 2/2004 | Birdwell et al. | 370/270 |
| 2005/0036068 A1 * | 2/2005 | Shin | 348/565 |
| 2005/0268321 A1 * | 12/2005 | Milirud et al. | 725/118 |
| 2008/0246851 A1 * | 10/2008 | Jung et al. | 348/222.1 |

* cited by examiner

*Primary Examiner* — Jefferey Harold
*Assistant Examiner* — Sean Haiem
(74) *Attorney, Agent, or Firm* — Cha & Reiter, LLC (57) ABSTRACT

An apparatus and a method for providing a Digital Multimedia Broadcasting (DMB) service using a digital TeleVision (TV) and an external device are provided. It is determined whether a received broadcast channel supports a Multi Mode Service (MMS), and if so, one of subchannels included in the broadcast channel is set to a main channel. The digital TV reproduces a broadcast signal via the main channel, and broadcast signals of subchannels excluding the main channel are transmitted to at least one external device in communication with the digital TV.

20 Claims, 6 Drawing Sheets

APPARATUS AND METHOD FOR PROVIDING DIGITAL MULTIMEDIA BROADCAST SERVICE USING AN EXTERNAL DEVICE AND A DIGITAL TV

CLAIM OF PRIORITY

This application claims the benefit of an earlier Korean Patent application filed in Korean Intellectual Property Office on Feb. 10, 2009 and assigned Serial No. 10-2009-0010459, the entire disclosure of which is hereby incorporated by reference.

BACKGROUND OF THE INVENTION

1. Field of the Invention

The present invention relates to an apparatus and a method for providing a Digital Multimedia Broadcasting (DMB) service using an external device and a digital TeleVision (TV). More particularly, the present invention relates to an apparatus and a method for connecting an external device with a digital TV and providing a MultiMode Service (MMS) in a DMB system.

2. Description of the Related Art

A Digital Multimedia Broadcasting (DMB) provides up-to-date broadcasting, such as radio broadcasting that uses a satellite, ground waves, or sky waves, TV broadcasting, and data for mobile communication.

Today, a digital TV provides a Picture In Picture (PIP) technique or a Picture By Picture (PBP) technique which reproduces two or more image signals on one screen to allow a user to view a plurality of images. For example, the digital TV provides a function of dividing one screen into two screens to allow a user to simultaneously view images of two broadcast channels.

Figure 1:
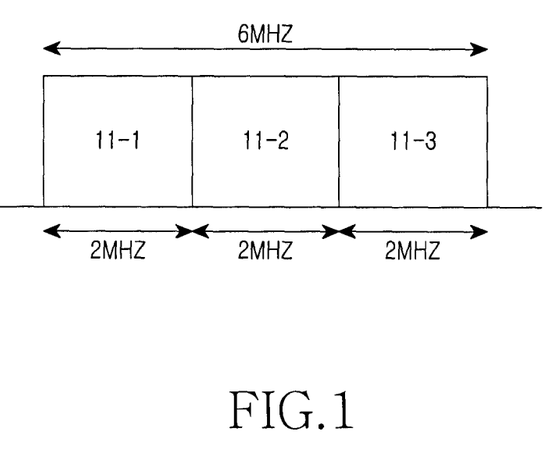
FIG. 1 is a view illustrating a broadcast channel technique according to a Multi Mode Service (MMS)

Recently, a Multi Mode Service (MMS) technique for transmitting a plurality of broadcast signals via one broadcast channel has been developed. For example, as illustrated in FIG. 1, developing from transmitting one High Definition (HD) class broadcast signal using a bandwidth of about 6 MHz conventionally, recently, a technique for dividing the bandwidth of about 6 MHz into bandwidths of about 2 MHz, and transmitting different three Standard Definition (SD) class broadcast signals is being studied. Here, the HD and SD are image standards provided by the DMB. The SD provides resolution similar to that of an image provided by the conventional analog broadcast system, and the HD provides four to five times higher resolution than that of the SD.

The above-described MMS technique transmits screens shot by three cameras via one broadcast channel in the case where a plurality of cameras perform shooting as in a ball park to allow a user to view all three screens shot by the three cameras using a PIP or PBP function of a digital TV, or select and view only one desired screen.

However, since a technique for dividing one screen and reproducing a plurality of images in a digital TV, divides one screen as described above reproduces each image on the divided screen, a size of an image is reduced. Also, only images are separated in the conventional technique, and voices are not separated.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a DMB service using an external device and a digital TV.

Another aspect of the present invention is to provide an apparatus and a method for connecting an external device with a digital TV and thereby providing a Multi Mode Service (MMS) in a DMB system.

In accordance with an aspect of the present invention, a method for supporting a MultiMode Service (MMS) in a digital TeleVision (TV) is provided. The method includes determining whether a received broadcast channel supports an MMS, when the broadcast channel supports the MMS, setting one of subchannels included in the broadcast channel to a main channel, reproducing, at the digital TV, a broadcast signal of the main channel, and transmitting broadcast signals of subchannels excluding the main channel to at least one external device coupled to the digital TV.

In accordance with another aspect of the present invention, a method for supporting a MultiMode Service (MMS) in an external device is provided. The method includes when a broadcast view event occurs, receiving a broadcast signal of a subchannel from a digital TeleVision (TV) coupled to the external device, and reproducing the received broadcast signal.

In accordance with still another aspect of the present invention, an apparatus for supporting a MultiMode Service (MMS) in a digital TeleVision (TV) is provided. The apparatus includes a signal processor for determining whether a received broadcast channel supports the MMS, when the broadcast channel supports the MMS, sets one of subchannels included in the broadcast channel to a main channel, and controls the digital TV to reproduce a broadcast signal from the main channel, and an interface controller for transmitting broadcast signals of subchannels excluding the main channel to at least one external device coupled to the digital TV.

In accordance with further another aspect of the present invention, an apparatus for supporting a MultiMode Service (MMS) in an external device is provided. The apparatus includes a receiver for, when a broadcast view event occurs, receiving a broadcast signal of a subchannel from a digital TeleVision (TV) coupled to the external device, and a reproducing unit for reproducing the received broadcast signal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent to those skilled in the art from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Further, descriptions of well-known functions and constructions are omitted for clarity and conciseness.

Note that the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide an apparatus and a method for connecting a digital TV with an external device and providing an MMS in a DMB system. The external device according to an exemplary embodiment of the present invention includes all electronic devices having a display unit, and may be a cellular phone, a Portable Multimedia Player (PMP), a Personal Digital Assistant (PDA), a Motion Picture Expert Group Audio Layer-3 (MP3) player, a computer, etc. In addition, in the case of supporting an MMS, description will be made using a case where three subchannels are included in one broadcast channel for illustrative purpose. Thus, it should be noted that other number of subchannels may be used according to the teachings of the present invention.

Figure 2:
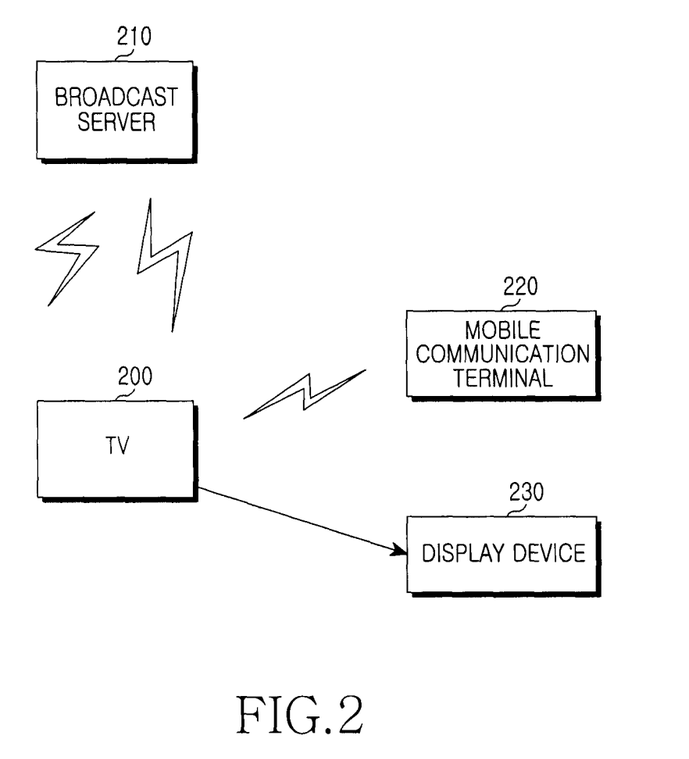
FIG. 2 is a block diagram illustrating a DMB system according to an exemplary embodiment of the present invention.

FIG. 2 is a block diagram illustrating a DMB system according to an exemplary embodiment of the present invention.

Referring to FIG. 2, a digital TV 200 receives signals from a broadcast channel from a broadcast server 210 and determines whether the broadcast channel supports a Multi Mode Service (MMS). When the broadcast channel supports the MMS, the digital TV 200 sets one of three subchannels included in the broadcast channel to a main channel. After that, the digital TV 200 reproduces a broadcast signal of the set main channel via a screen of the digital TV 200, and transmits broadcast signals of subchannels excluding the main channel to external devices 220 and 230, which are in communication or communicatively coupled to the digital TV 200. The digital TV 200 and the external devices 220 and 230 may be in communication via wired lines such as a Universal Serial Bus (USB), D-sub, a Digital Visual Interface (DVI), and a High Definition Multimedia Interface (HDMI), or a near field wireless communication scheme such as a wireless Local Area Network (LAN), Bluetooth, and Zigbee, so that the digital TV 200 transmits the broadcast signals to the external devices 220 and 230 according to a preset connection scheme.

For example, when a broadcast channel No. 11 having subchannels 11-1, 11-2, and 11-3 which the digital TV 200 desires to receive supports of an MMS, the digital TV 200 sets the subchannel 11-1 of the three subchannels as a main channel, and reproduces a broadcast signal received from the channel 11-1 on a screen of the digital TV 200, and meanwhile receives broadcast signals from the subchannels 11-2 and 11-3 and transmits those broadcast signals to the mobile communication terminal 220 connected via Bluetooth and the display device 230 connected via a USB.

The mobile communication terminal 220 and the display device 230 receive broadcast signals from the digital TV 200 according to the preset connection scheme with the digital TV 200, and reproduce the received broadcast signals accordingly.

Figure 3:
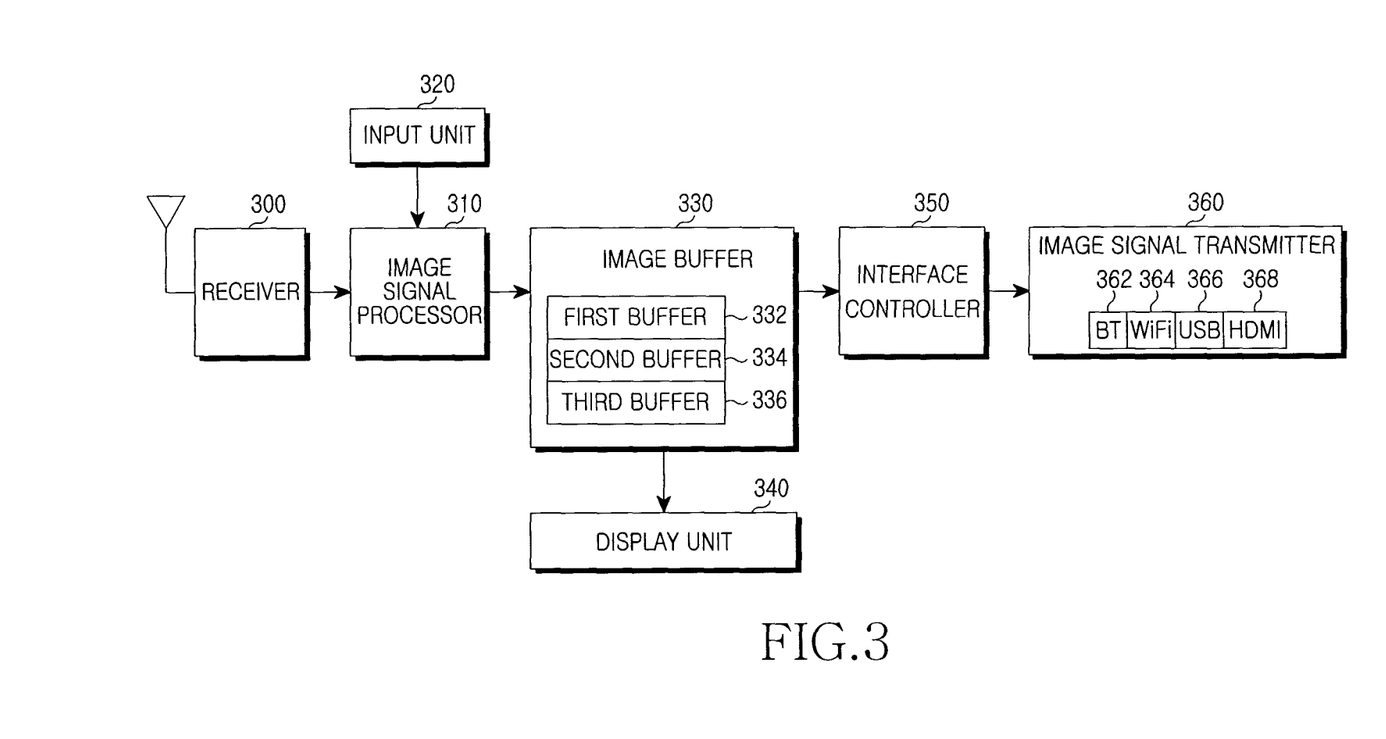
FIG. 3 is a block diagram illustrating a digital TV in a DMB system according to an exemplary embodiment of the present invention.

FIG. 3 is a block diagram illustrating a digital TV in a DMB system according to an exemplary embodiment of the present invention.

Referring to FIG. 3, the digital TV includes a receiver 300, an image signal processor 310, an input unit 320, an image buffer 330, a display unit 340, an interface controller 350, and an image signal transmitter 360.

The receiver 300 receives a signal of a broadcast channel from a broadcast server and provides the received signal to the image signal processor 310.

The image signal processor 310 decodes an input image signal according to a predetermined scheme, and outputs the same to the image buffer 330. More particularly, according to an exemplary embodiment of the present invention, the image signal processor 310 decodes a signal of a broadcast channel provided from the receiver 300 to determine whether the broadcast channel supports an MMS using the header information. When the broadcast channel supports the MMS, the image signal processor 310 sets one of subchannels of the broadcast channel to a main channel. The main channel may be set according to a predetermined method, or set by a user's selection via the input unit 320. In addition, when the broadcast channel supports the MMS, the image signal processor 310 controls to divide the image buffer 330 into three regions, controls to output image signals from a subchannel set to the main channel from the image buffer 330 to the display unit 340, and controls to output image signals of the other subchannels to the interface controller 350. In contrast, when the broadcast channel does not support the MMS, the image signal processor 310 provides signals of the broadcast channel to the image buffer 330 and controls to output the signals to the display unit 340.

The image buffer 330 buffers input image signals and provides the image signals to the display unit 340 or the interface controller 350 under control of the image signal processor 310. When the broadcast channel supports the MMS, the image buffer 330 divides a buffer region into three buffer regions 332, 334, and 336, buffers image signals of each subchannel using the respective buffer, outputs image signals of a subchannel set to the main channel to the display unit 340, and provides image signals of the other subchannels to the interface controller 350 under control of the image signal processor 310. Note that the three buffer regions 332, 334, and 336 of the image buffer 330 are not discriminated as physical regions but discriminated as logical regions.

The interface controller 350 detects connection and a connection scheme with external devices, converts RGB image data of each subchannel provided from the image buffer 330 so that the image data is suitable for an interface corresponding to the connection scheme, and provides the converted image data to the image signal transmitter 360.

The image signal transmitter 360 transfers the image signal converted by the interface controller 350 to the external devices according to the connection scheme. For example, when the digital TV supports a Bluetooth (BT) 362, Wireless Fidelity (WiFi) 364, a USB 366, and an HDMI 368, the image signal transmitter 360 transfers the image signal to the external devices using one of schemes.

Figure 4:
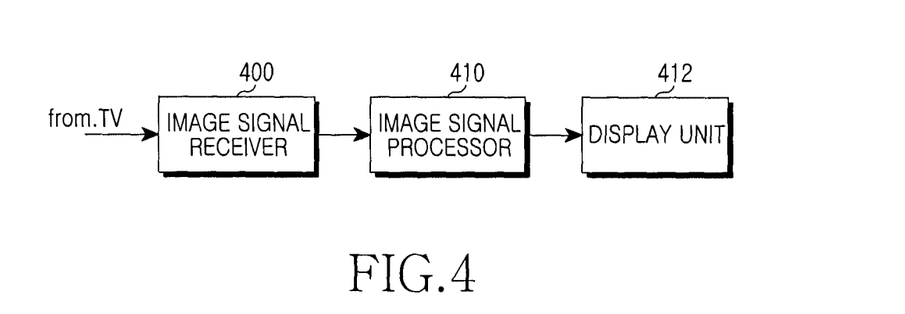
FIG. 4 is a block diagram illustrating an external device in a DMB system according to an exemplary embodiment of the present invention.

FIG. 4 is a block diagram illustrating an external device in a DMB system according to an exemplary embodiment of the present invention.

The image signal receiver 400 receives an image signal from a digital TV via a wired line or wirelessly and provides the received image signal to the image signal processor 410.

The image signal processor 410 converts the image signal received from the digital TV so that the image signal is suitable for a screen of the external device, then provides the converted image signal to the display unit 412.

Finally, the display unit 412 displays the image signal converted by the image signal processor 410.

Figure 5:
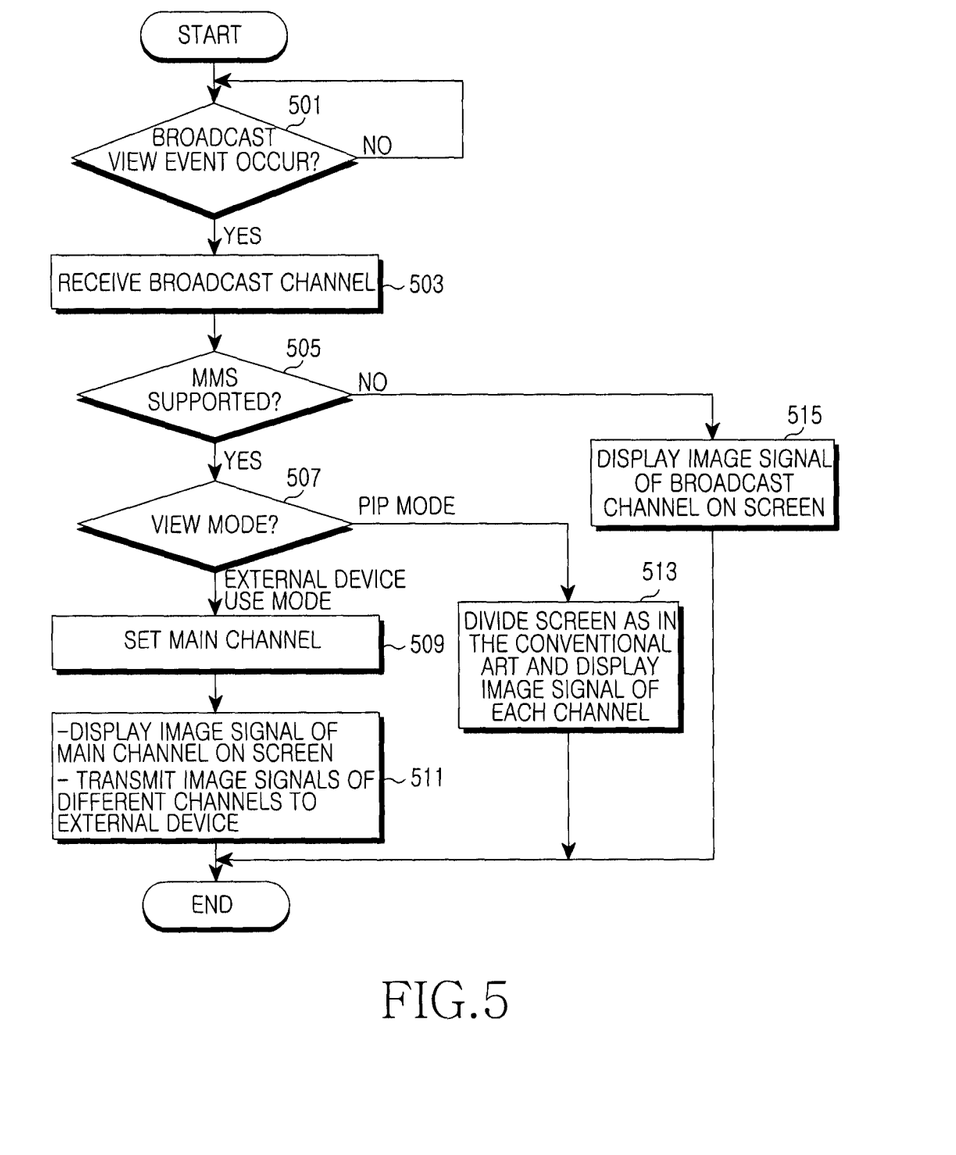
FIG. 5 is a flowchart illustrating a procedure for operating a digital TV in a DMB system according to an exemplary embodiment of the present invention.

FIG. 5 is a flowchart illustrating a procedure for operating a digital TV in a DMB system according to an exemplary embodiment of the present invention.

Referring to FIG. 5, the digital TV determines whether a broadcast view event occurs in step 501. When the broadcast view event occurs in step 501, the digital TV receives and decodes a relevant broadcast channel in step 503.

The digital TV determines whether the broadcast channel supports an MMS with reference to header information of a signal of the received broadcast channel in step 505. When the broadcast channel does not support the MMS, the digital TV displays an image of the broadcast channel on a screen of the digital TV in step 515. Here, the digital TV continuously performs step 515 until the broadcast view event terminates, and when the broadcast view event terminates, ends the present algorithm according to an exemplary embodiment of the present invention.

In contrast, when the broadcast channel supports the MMS, the digital TV determines a view mode set by a user in step 507. When the view mode set by the user is an external device use mode, the digital TV sets one of subchannels of the broadcast channel to a main channel in step 509. Here, the main channel may be set and selectively changed by the user. The digital TV displays an image signal of the subchannel set to the main channel on a screen, and transmits image signals of the other subchannels excluding the main channel to an external device in communication with the digital TV in step 511. At this point, the digital TV transmits the image signals of the subchannels to the external device according to a connection scheme to the external device. For example, in the case where the digital TV is connected with a mobile communication terminal via a USB, the digital TV transmits the image signals to the mobile communication terminal via the USB. In the case where the digital TV is connected with a mobile communication terminal via Bluetooth, the digital TV transmits the image signals to the mobile communication terminal via the Bluetooth. Here, the digital TV constantly performs step 511 until a broadcast view event terminates. When the broadcast view event terminates, the digital TV ends the present algorithm according to an exemplary embodiment of the present invention.

Note that when the view mode set by the user is a Picture In Picture (PIP) mode, the digital TV divides a screen of the digital TV as in the conventional art and displays an image signal of each subchannel on each divided screen in step 513. The digital TV constantly performs step 513 until a broadcast view event terminates, and when the broadcast view event terminates, ends the present algorithm according to an exemplary embodiment of the present invention.

Figure 6:
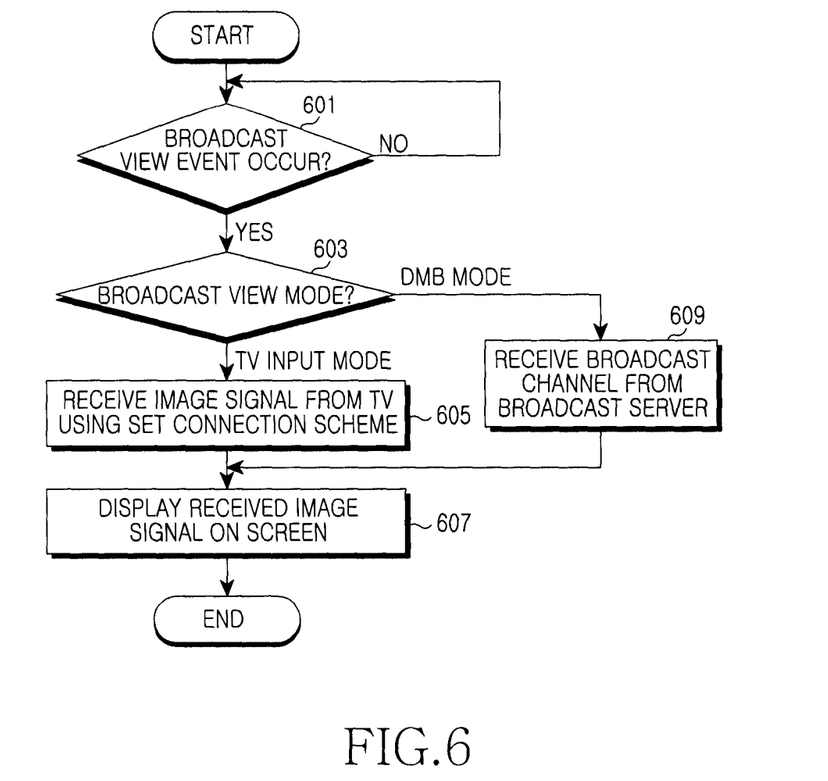
FIG. 6 is a flowchart illustrating a procedure for operating an external device in a DMB system according to an exemplary embodiment of the present invention.

FIG. 6 is a flowchart illustrating a procedure for operating an external device in a DMB system according to an exemplary embodiment of the present invention.

Referring to FIG. 6, the external device determines whether a broadcast view event occurs in step 601. When the broadcast view event occurs in step 601, the external device determines a broadcast view mode in step 603.

When the broadcast view mode is a TV input mode, the external device receives an image signal from a digital TV connected with the external device according to a predetermined connection scheme in step 605, processes the received image signal so that the image signal is suitable for a screen of the external device, and displays the processed image signal in step 607. Here, the external device constantly performs steps 605 and 607 until the broadcast view event terminates, and when the broadcast view event terminates, ends the present algorithm according to an exemplary embodiment of the present invention.

When the broadcast view mode is a DMB mode, the external device receives a broadcast channel from a broadcast server using a DMB function provided inside the external device in step 609, and processes a received broadcast signal so that the broadcast signal is suitable for the screen of the external device, and displays the processed broadcast signal in step 607. Here, the external device constantly performs steps 609 and 607 until the broadcast view event terminates, and when the broadcast view event terminates, ends the present algorithm according to an exemplary embodiment of the present invention.

In the above description, an image signal of a broadcast signal has been described as an example, but it should be noted that the teachings of the present invention is also applicable to a voice signal.

According to an exemplary embodiment of the present invention, when a DMB system supports an MMS, a digital TV and an external device are connected via a wired line or wirelessly. The digital TV and the external device reproduce, respectively, a plurality of signals from one broadcast channel received by the digital TV, so that a user can view a plurality of screens from one broadcast channel without dividing a screen. Note that not only a plurality of images but also a plurality of voices from one broadcast channel can be provided.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for supporting a broadcasting service in an electronic device, the method comprising:
when a received broadcast channel supports a multimode service comprising a plurality of screens shot from respective cameras, or a plurality of images or voices, setting one of a plurality of subchannels included in the received broadcast channel as a main channel and transmitting a remainder of the plurality of subchannels to a corresponding plurality of external devices, each external device for display of a particular subchannel screen from the received broadcast channel so as not to divide any of the displays for viewing of the plurality of screen shots;
reproducing a broadcast signal of the main channel in a display of the electronic device;
and at the same time transmitting respective broadcast signals of subchannels excluding a broadcast of the main channel to respective external devices in communication with the electronic device.

2. The method of claim 1, wherein the electronic device and the respective external devices are communicatively coupled via a wired line or a near field wireless communication scheme.

3. The method of claim 2, wherein the electronic device and the respective external devices communicatively coupled via one of a Universal Serial Bus (USB), D-sub, a Digital Visual Interface (DVI), a High Definition Multimedia Interface (HDMI), a wireless Local Area Network (LAN), a Bluetooth, and Zigbee.

4. The method of claim 1, wherein the main channel is selectively changeable by a user.

5. he method of claim 1, wherein whether the received broadcast channel supports the multi mode service is determined using header information of a received signal from the broadcast channel.

6. The method of claim 1, wherein the broadcast signals comprises voice signals.

7. A method for supporting a MultiMode Service (MMS) in an external device, the method comprising:
receiving a broadcast signal of a subchannel from a digital TeleVision (TV) in communication with the external device, the subchannel transmitting a portion of signals received by the digital TV from a broadcaster; and
reproducing the received broadcast signal via the external device, wherein at the same time the digital TV displays a main channel that is different from the subchannel transmitted to the external device,
determining when a view mode is set to an external device use mode, wherein multimode service comprises a plurality of screens shot from respective cameras, or a plurality of images or voices, and
setting one of a plurality of subchannels included in the received broadcast channel as the main channel and transmitting a remainder of the plurality of subchannels to a corresponding plurality of external devices, each external device for display of a particular subchannel screen from the received broadcast channel so as not to divide any of the displays for viewing of the plurality of screen shots.

8. The method of claim 7, wherein the external device and the digital TV are communicatively coupled via a wired line or a near field wireless communication scheme.

9. The method of claim 7, wherein the external device and the digital TV are communicatively coupled via one of a Universal Serial Bus (USB), D-sub, a Digital Visual Interface (DVI), a High Definition Multimedia Interface (HDMI), a wireless Local Area Network (LAN), a Bluetooth, and Zigbee.

10. The method of claim 7, wherein the broadcast signal comprises a voice signal.

11. An apparatus for supporting a broadcasting service in an electronic device, comprising:
a signal processor for determining whether a received broadcast channel supports a multi mode service, and when the broadcast channel supports the multi mode service, for determining when a view mode is set to an external device use mode, setting one of a plurality of subchannels included in the broadcast channel to a main channel in the external device use mode, and controls the electronic device to reproduce a broadcast signal from the main channel; and
an interface controller for transmitting broadcast signals of subchannels excluding the main channel to at least one external device in communication with the electronic device while the electronic device is displaying the main channel, and wherein the interface controller transmitting a remainder of the plurality of subchannels to a corresponding plurality of external devices, each external device for display of a particular subchannel screen from the received broadcast channel so as not to divide any of the displays for viewing of the plurality of screen shots.

12. The apparatus of claim 11, wherein the electronic device and the external device are communicatively coupled via a wired line or a near field wireless communication scheme.

13. The apparatus of claim 11, wherein the electronic device and the external device are communicatively coupled via one of a Universal Serial Bus (USB), D-sub, a Digital Visual Interface (DVI), a High Definition Multimedia Interface (HDMI), a wireless Local Area Network (LAN), a Bluetooth, and Zigbee.

14. The apparatus of claim 11, wherein the main channel is selectively changeable by a user.

15. The apparatus of claim 11, wherein whether the received broadcast channel supports the multi mode service is determined using header information of a received signal from the broadcast channel.

16. The apparatus of claim 11, wherein the broadcast signal comprises a voice signal.

17. An apparatus for supporting a MultiMode Service (MMS) in an external device, the apparatus comprising:
a receiver for, when a broadcast view event occurs, receiving a broadcast signal of a subchannel from a digital TeleVision (TV) in communication with the external device, the subchannel transmitting a portion of signals received by the digital TV from a broadcaster that are different from a main channel being displayed by the digital TV;
an interface controller for transmitting broadcast signals of subchannels excluding the main channel to at least one external device in communication with the electronic device while the electronic device is displaying the main channel, and wherein the interface controller transmitting a remainder of the plurality of subchannels to a corresponding plurality of external devices, each external device for display of a particular subchannel screen from the received broadcast channel so as not to divide any of the displays for viewing of the plurality of screen shots;

wherein when a view mode is set to an external device use mode, setting one of a plurality of subchannels included in the broadcast channel to a main channel in the external device use mode, and controlling the electronic device to reproduce a broadcast signal from the main channel; and and a reproducing unit for reproducing the received broadcast signal.

18. The apparatus of claim 17, wherein the external device and the digital TV are communicatively coupled via a wired line or a near field wireless communication scheme.

19. The apparatus of claim 17, wherein the external device and the digital TV are communicatively coupled via one of a Universal Serial Bus (USB), D-sub, a Digital Visual Interface (DVI), a High Definition Multimedia Interface (HDMI), a wireless Local Area Network (LAN), a Bluetooth, and Zigbee.

20. The apparatus of claim 17, wherein the broadcast signal comprises a voice signal.

\* \* \* \* \*

UNITED STATES PATENT AND TRADEMARK OFFICE
CERTIFICATE OF CORRECTION

PATENT NO. : 8,456,573 B2
APPLICATION NO. : 12/696289
DATED : June 4, 2013
INVENTOR(S) : Cheol-Sun Yoo It is certified that error appears in the above-identified patent and that said Letters Patent is hereby corrected as shown below:

In the Claims:

Column 7, Claim 5, Line 40 should read as follows:
--...The method of...--

Signed and Sealed this
Thirteenth Day of August, 2013

Teresa Stanek Rea
*Acting Director of the United States Patent and Trademark Office*